E. P. HALLANDER.
BALL AND ROLLER BEARING.
APPLICATION FILED FEB. 27, 1920.
1,358,634.
Patented Nov. 9, 1920.
Fig. 1.
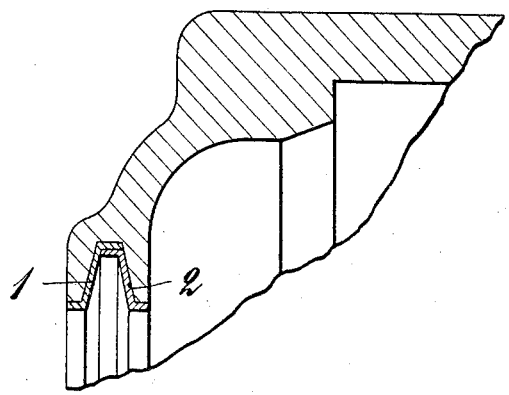
Fig. 2.
Fig. 3.
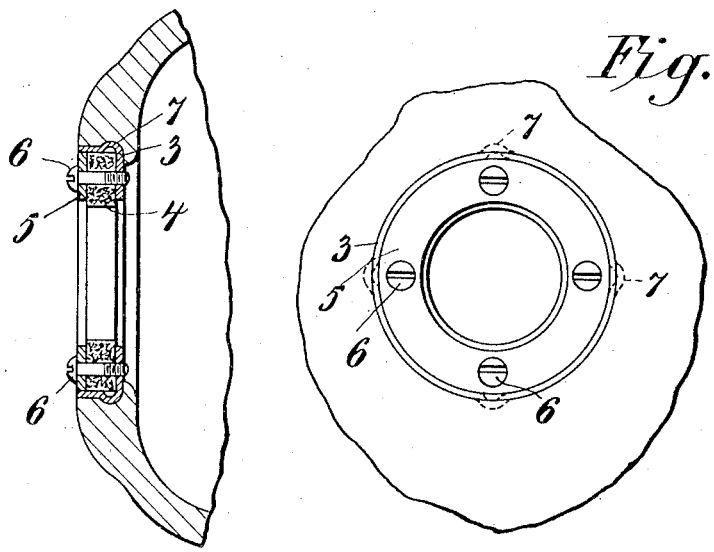
Inventor
E. P. Hallander
By H. R. Kerslake
Attorney

UNITED STATES PATENT OFFICE.

ERIK PAULINUS HALLANDER, OF SPÄNGA, NEAR STOCKHOLM, SWEDEN.

BALL AND ROLLER BEARING.

1,358,634.   Specification of Letters Patent.   Patented Nov. 9, 1920.

Application filed February 27, 1920. Serial No. 361,849.

*To all whom it may concern:*

Be it known that I, ERIK PAULINUS HALLANDER, engineer, a subject of the King of Sweden, and resident of Spänga, near Stockholm, Sweden, have invented certain new and useful Improvements in Ball and Roller Bearings, of which the following is a specification, reference being made to the accompanying drawing.

The present invention relates to ball and roller bearings and particularly to such bearings that are provided with a dust stopping ring inserted in a groove or the like that is specially arranged for the same in the housing or casing surrounding the bearing. When said groove is to be arranged in a housing of chill-casting, which is not in two halves parallel with the longitudinal direction of the shaft but composed of parts, each of which comprises a portion surrounding the shaft, the groove may be obtained in the casting only if the core necessary for the same is in several pieces, which, however, considerably increases the cost and is very inconvenient. If the said groove is not obtained in casting the piece it must be made afterward in a machine tool, but this is a rather difficult work, owing to the hardness of the metal.

In order to obviate these inconveniences and difficulties and still obtain a groove, which is just as even and uniform as a machined one, the groove is produced, according to this invention, by the arrangement of a lining of sheet iron or the like, which in a press or in any convenient manner is given the desired shape of the groove and which, in the casting of the housing, either as a whole or partially is embedded in the casting.

The invention is illustrated in the accompanying drawing, in which Figure 1 is a partial cross sectional view of that part of the housing where the groove for the dust stopping ring is situated. Fig. 2 shows a modification. Fig. 3 is an end elevation of the modification shown in Fig. 2.

According to Fig. 1 the lining in the groove consists of a sheet metal ring, which for the sake of facilitating the manufacturing of the same is composed of two parts 1 and 2 and which, at the casting of the housing, are embedded in the metal. If desired, the sheet metal ring may evidently be made in one single piece.

The lining may also be made in such a way that only a sheet metal ring 3, having the shape shown in Fig. 2, is embedded in the casting, and the felt ring 4 is clamped against the same by means of a washer 5 and screws 6 acting on the latter. In order that the ring 3 may securely rest in its place it may be provided with a plurality of projections 7 or the like.

Instead of a lining obtained by pressing sheet metal, it is evident that a ring, cast of suitable metal and of any desired cross section, may be embedded in the housing when being cast.

By arranging a lining in the groove as above described it is evident, that there is no need for any subsequent work in the hard metal and that an even groove for the dust stopping felt ring is obtained.

Having now described my invention what I claim as new and desire to secure by Letters Patent is—

1. The combination with a cast metal housing for a ball or roller bearing, of a dust stopping ring lining having a peripheral extension embedded in the housing during casting for receiving the ring.

2. An arrangement as claimed in claim 1 wherein the lining is composed of two complemental sections.

3. An arrangement as claimed in claim 1 wherein projections are provided at suitably spaced intervals on the peripheral extension of the lining for the purpose of securely holding the lining in the housing.

4. An arrangement as claimed in claim 1 wherein the lining is composed of two sections one of which is stationary while the other is in the form of a washer for abutting one side of the dust stopping ring and a plurality of fastening devices passing through the washer section and the ring and anchored in the other section of the lining.

5. The combination with a cast metal housing for a ball or roller bearing, of a dust member carrying lining ring having a channel-shaped peripheral portion, said ring being embedded in the housing during the casting of said housing.

6. In a bearing a dust member gearing lining ring having an annular channel, shaped peripheral portion, and a housing cast around said ring and engaging the channel-shaped portion of the same.

In witness whereof I have hereunto set my hand in presence of two witnesses.

ERIK PAULINUS HALLANDER.

Witnesses:
CARL TH. SUNDHOLM,
KARL JONSSON.